US012452662B2

(12) United States Patent
Kosugi et al.

(10) Patent No.: US 12,452,662 B2
(45) Date of Patent: Oct. 21, 2025

(54) AUTHENTICATION SYSTEM, AND USER INTERFACE DEVICE

(71) Applicant: KABUSHIKI KAISHA TOKAI RIKA DENKI SEISAKUSHO, Aichi (JP)

(72) Inventors: Masanori Kosugi, Aichi (JP); Hideki Kawai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 390 days.

(21) Appl. No.: 17/885,808

(22) Filed: Aug. 11, 2022

(65) Prior Publication Data

US 2023/0065436 A1 Mar. 2, 2023

(30) Foreign Application Priority Data

Aug. 25, 2021 (JP) ................. 2021-137071

(51) Int. Cl.
*H04W 12/06* (2021.01)
(52) U.S. Cl.
CPC .................. *H04W 12/06* (2013.01)
(58) Field of Classification Search
CPC .................................... H04W 12/06
USPC ........................................ 455/411
See application file for complete search history.

(56) References Cited

U.S. PATENT DOCUMENTS

| 2007/0268110 | A1* | 11/2007 | Little | B60R 25/24 340/5.1 |
| 2008/0238135 | A1* | 10/2008 | Takeda | E05F 15/77 296/146.4 |
| 2014/0220887 | A1 | 8/2014 | Yang et al. | |
| 2015/0333802 | A1 | 11/2015 | Yang et al. | |
| 2016/0138305 | A1* | 5/2016 | Noguchi | E05B 81/58 70/263 |
| 2016/0218773 | A1 | 7/2016 | Yang et al. | |
| 2018/0363338 | A1* | 12/2018 | Ichinose | B60R 25/24 |
| 2019/0051072 | A1* | 2/2019 | Okada | H04W 4/40 |
| 2019/0242176 | A1* | 8/2019 | Nihei | B60J 5/10 |
| 2020/0160635 | A1 | 5/2020 | Koizumi et al. | |
| 2022/0043101 | A1* | 2/2022 | Sanji | H01Q 1/3241 |

FOREIGN PATENT DOCUMENTS

| JP | 2014-224446 A | 12/2014 |
| JP | 2015-518666 | 7/2015 |
| JP | 2020-084469 | 6/2020 |

OTHER PUBLICATIONS

Japanese Office Action dated Oct. 22, 2024 issued in Japanese Patent Application No. 2021-137071 along with corresponding English translation.

* cited by examiner

*Primary Examiner* — Qutbuddin Ghulamali
(74) *Attorney, Agent, or Firm* — GREENBLUM & BERNSTEIN P.L.C.

(57) ABSTRACT

An antenna is configured to receive authentication information through wireless communication from a mobile device adapted to be carried by a user. A detector is configured to perform detection of approach or contact of an object to be detected with respect to the antenna based on a change in an electrostatic capacitance. A control device is configured to control an operation of a device to be controlled based on a result of the detection in addition to authentication for authenticating the mobile device with the authentication information.

8 Claims, 4 Drawing Sheets

AUTHENTICATION SYSTEM, AND USER INTERFACE DEVICE

CROSS-REFERENCE TO RELATED APPLICATION

The present application is based on Japanese Patent Application No. 2021-137071 filed on Aug. 25, 2021, the entire contents of which are incorporated herein by reference.

BACKGROUND

The presently disclosed subject matter relates to an authentication system using a mobile device adapted to be carried by a user. The presently disclosed subject matter also relates to a user interface device adapted to form a part of the authentication system.

Japanese Patent Publication No. 2014-224446 A discloses an authentication system for locking/unlocking a door of a vehicle, which is an example of the reclosable body, using the proximity wireless communication. The authentication system includes a sheet antenna and a control device. The sheet antenna is disposed on an outer face of the door. The control device performs authentication of a user based on the proximity wireless communication performed between the sheet antenna and an antenna installed in a mobile device to control operations of a locking/unlocking device that is an example of a device to be controlled.

SUMMARY

It is demanded to improve the convenience of an authentication system using a mobile device.

An illustrative aspect of the presently disclosed subject matter provides an authentication system, comprising:
   an antenna configured to receive authentication information through wireless communication from a mobile device adapted to be carried by a user;
   a detector configured to perform detection of approach or contact of an object to be detected with respect to the antenna based on a change in an electrostatic capacitance; and
   a control device configured to control an operation of a device to be controlled based on a result of the detection in addition to authentication for authenticating the mobile device with the authentication information.

An illustrative aspect of the presently disclosed subject matter provides a user interface device, comprising:
   an antenna configured to receive authentication information through wireless communication from a mobile device adapted to be carried by a user;
   a detector configured to perform detection of approach or contact of an object to be detected with respect to the antenna based on a change in an electrostatic capacitance; and
   a processor configured to output the authentication information and a result of the detection to a control device that is configured to control an operation of a device to be controlled.

According to the configuration of each of the illustrative aspects described above, the operation of the device to be controlled is allowed in response to the user's action bringing an appropriate mobile device close to the antenna and subjecting the object to the detection based on the change in the electrostatic capacitance. When a user subjects the object to the detection based on the change in the electrostatic capacitance, there is a high possibility that the user has an intention to operate the device to be controlled. The operation of the device to be controlled is not allowed only with the authentication approval of the mobile device but the detection of the object based on the change in the electrostatic capacitance is added to the condition for allowing the operation. As a result, it is possible to suppress the occurrence of a situation that the operation of the device to be controlled is unexpectedly performed without the user's intention for causing the device to perform the operation.

In addition, since the antenna for the wireless communication with the mobile device is also used as an electrode of the electrostatic sensor, there is no need to install an independent electrostatic sensor for confirming the intention of the user. As a result, not only it is possible to suppress an increase in size of the user interface device, but also it is possible to avoid a situation that an electrode plate that is generally used in the electrostatic sensor affects the frequency characteristics of the antenna. Accordingly, it is possible to improve the convenience of the authentication system using the mobile device.

DESCRIPTION OF EMBODIMENTS

Exemplary embodiments will be described in detail below with reference to the accompanying drawings. In each of the drawings, the scale is appropriately changed in order to make each element illustrated have a recognizable size.

Figure 1:
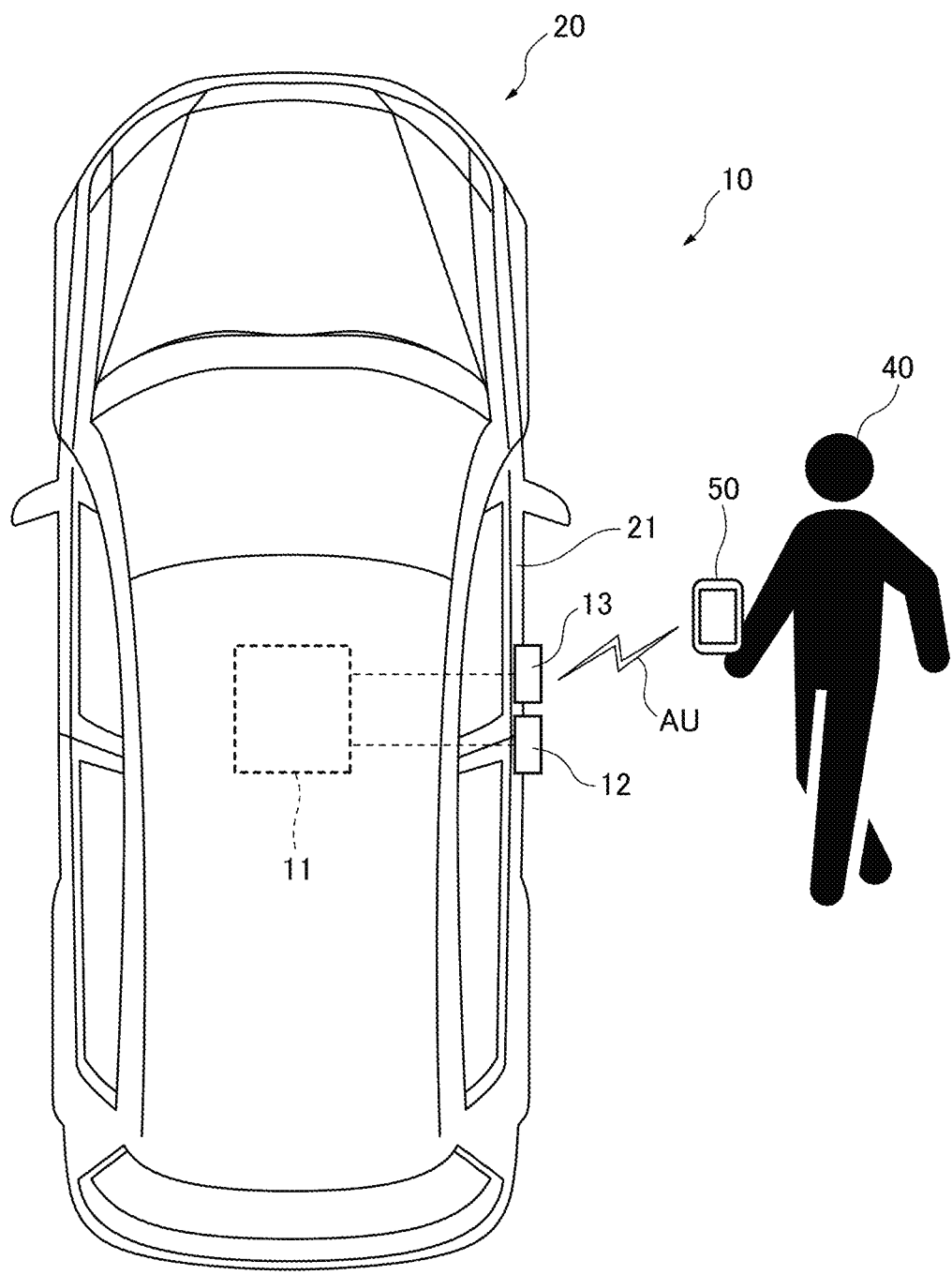
FIG. 1 illustrates a configuration of an authentication system according to an embodiment.

FIG. 1 illustrates a configuration of an authentication system 10 according to an embodiment. The authentication system 10 includes a control device 11 and a locking/unlocking device 12. The control device 11 and the locking/unlocking device 12 are installed in a vehicle 20. The locking/unlocking device 12 is a device for locking/unlocking a door 21 for opening/closing a cabin of the vehicle 20. The control device 11 is configured to control operations of the locking/unlocking device 12. The locking/unlocking device 12 is an example of a device to be controlled. The vehicle 20 is an example of a mobile entity. The door 21 is an example of a reclosable body.

The authentication system 10 includes a user interface device 13 (hereinafter, abbreviated as a UI device 13). The UI device 13 is configured to acquire authentication information AU from a mobile device 50 adapted to be carried by a user 40 through proximity wireless communication. The mobile device 50 may be provided as a portable medium such as a card that is not equipped with a power source, or may be provided as a general-purpose portable information terminal such as a smartphone. The authentication information AU includes information for authenticating at least one of the user 40 and the mobile device 50.

As used herein, "proximity wireless communication" means contactless communication in which information is transmitted from a mobile device to a reader device through electromagnetic inductive coupling. Examples of the technology capable of executing the proximity wireless communication include NFC (Near Field Communication), RF-ID, and the like. As used herein, the term "proximity wireless communication" is distinguished from "short-range wireless communication" which is non-contact communication performed with radio waves while complying with IEEE 802.15 or IEEE 802.11 standards. Examples of the technology capable of executing the short-range wireless communication include Bluetooth (registered trademark), Bluetooth Low Energy (registered trademark), Ultra Wide Band (UWB), ZigBee (registered trademark), and Wi-Fi (registered trademark).

Figure 2:
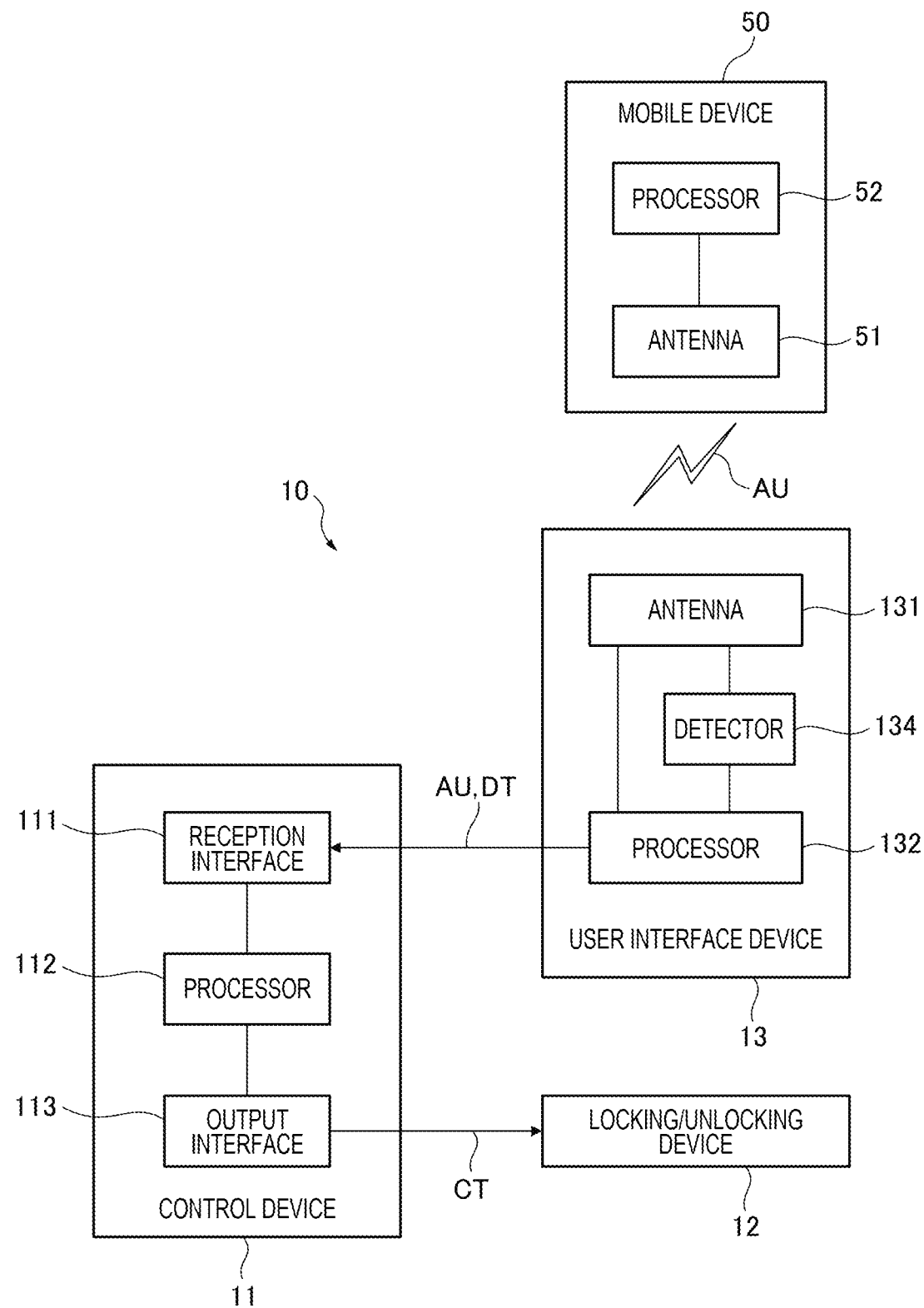
FIG. 2 illustrates a functional configuration of the authentication system of FIG. 1.

Specifically, as illustrated in FIG. 2, the UI device 13 includes an antenna 131. On the other hand, the mobile device 50 includes an antenna 51 and a processor 52. The antenna 51 has a well-known configuration capable of establishing an electromagnetic inductive coupling with the antenna 131. The processor 52 is configured to read the authentication information AU from a storage (not illustrated) upon initiation of the proximity wireless communication, and transmit the authentication information AU from the antenna 51. The authentication information AU is received by the antenna 131 of the UI device 13.

The processor 52 having such a function can be implemented by an exclusive integrated circuit in a case where the mobile device 50 is provided as a portable medium such as a card. A computer program for executing processing associated with the function is pre-installed in a memory element included in the integrated circuit. The authentication information AU may be stored in the memory element.

In a case where the mobile device 50 is provided as a general-purpose personal digital assistant, the processor 52 may be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the processing related to the above-described function can be stored in the ROM. The authentication information AU may be stored in the general-purpose memory. The general-purpose microprocessor designates at least a part of the computer program stored in the ROM, loads the program on the RAM, and executes the processing described above in cooperation with the RAM.

The processor 52 may be implemented by an exclusive integrated circuit capable of executing the above-described computer program. Examples of the exclusive integrated circuit include a microcontroller, an ASIC, and an FPGA. In this case, the above-described computer program is pre-installed in the memory element included in an exclusive integrated circuit. The authentication information AU may be stored in the memory element. The processor 52 may also be implemented by a combination of a general-purpose microprocessor and an exclusive integrated circuit.

Figure 3:
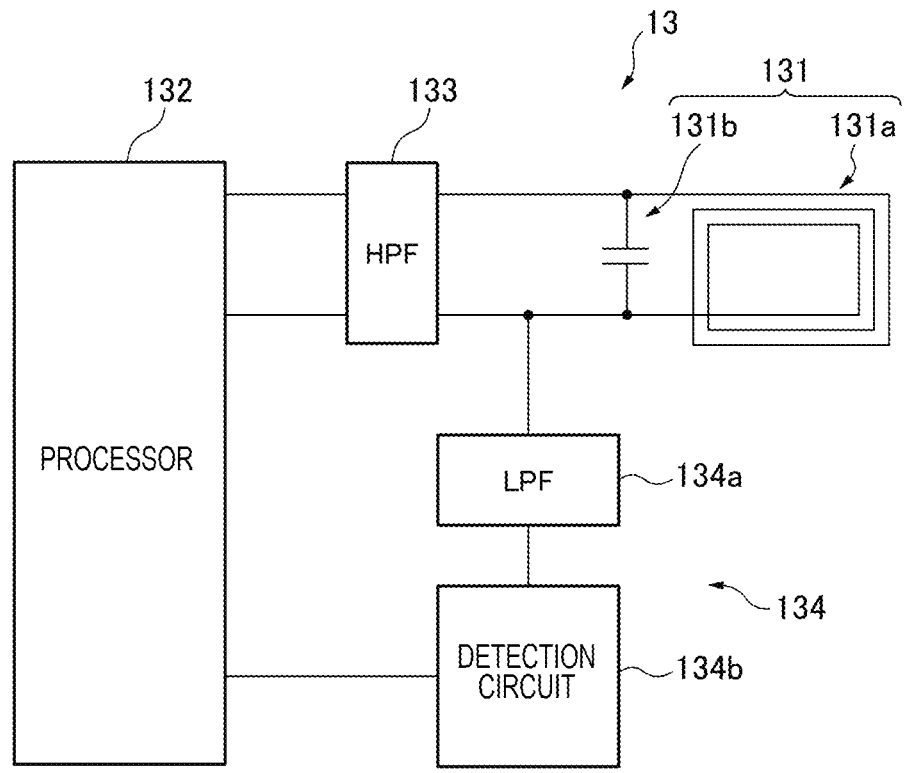
FIG. 3 illustrates a configuration of a user interface device of FIG. 2.

As illustrated in FIG. 3, the UI device 13 includes a processor 132. The antenna 131 according to the present example includes a coil 131a and a capacitor 131b. The coil 131a may serve as a loop antenna. The capacitor 131b is connected in parallel with the coil 131a. The processor 132 is configured to supply power to the antenna 131 to cause the antenna 131 to emit a magnetic field having a frequency used in the proximity wireless communication as a carrier wave.

For example, the processor 132 is configured to perform amplitude modulation of the carrier wave to superimpose information that is to be transmitted to the mobile device 50. On the other hand, current flows through the antenna 131 by a magnetic field emitted from the antenna 51 of the mobile device 50. The processor 132 is configured to extract the authentication information AU transmitted from the mobile device 50 by performing demodulation based on the current. The processor 132 is configured to transfer the extracted authentication information AU to the control device 11.

The UI device 13 includes a high-pass filter (HPF) 133. The HPF 133 is configured to pass at least a carrier frequency component of an AC signal traveling between the antenna 131 and the processor 132. The HPF 133 may include a capacitor connected to the processor 132 in series. The HPF 133 may include a resistor connected to the processor 132 in parallel.

As illustrated in FIG. 2, the control device 11 includes a reception interface 111. The reception interface 111 is configured as an interface capable of accepting the authentication information AU transmitted from the UI device 13.

The processor 112 is configured to collate the authentication information AU accepted by the reception interface 111 with the authentication information stored in a storage (not illustrated). The processor 112 is configured to determine that the authentication is approved in a case where the matching between the both information is confirmed.

Figure 4:
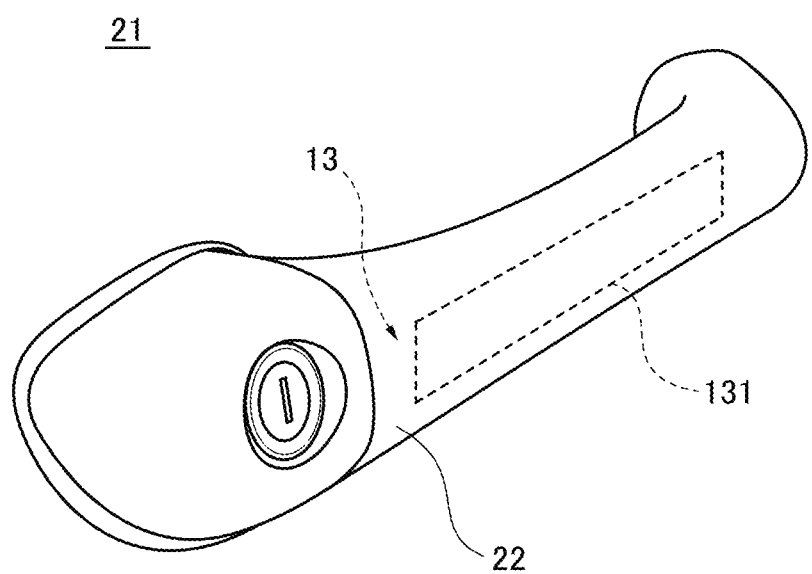
FIG. 4 illustrates a knob adapted to incorporate the user interface device of FIG. 2.

As illustrated in FIG. 4, the UI device 13 is incorporated in a knob 22 adapted to be used for opening and closing the door 21 of the vehicle 20. When the user 40 grips the knob 22 to open or close the door 21, the hand of the user 40 approaches the antenna 131. In a case where the antenna 131 is formed with relatively large amount of conductive material, the antenna 131 exhibits a behavior as an electrode. In other words, a pseudo capacitor is formed between the hand of the user 40 and the antenna 131, thereby increasing the electrostatic capacitance of the antenna 131.

As illustrated in FIG. 2, the UI device 13 includes a detector 134. The detector 134 is configured to detect the approach of the hand of the user 40 to the antenna 131 based on the change in the electrostatic capacitance. The hand of the user 40 is an example of an object to be detected.

Exemplary methods for increasing the amount of the conductive material forming the antenna 131 include: increasing a cross-sectional area of the loop antenna, increasing the number of windings of the loop antenna, and increasing the thickness of the conductive wire.

Particularly in a case where the conductive line is made thick, it is possible to suppress an influence that would be occurred in an originally intended property of the antenna 131.

Specifically, as illustrated in FIG. 3, the detector 134 includes a low-pass filter (LPF) 134a and a detection circuit 134b. The LPF 134a is configured to allow a low-frequency component of the signal flowing through the antenna 131 to pass through the detection circuit 134b.

Figure 5:
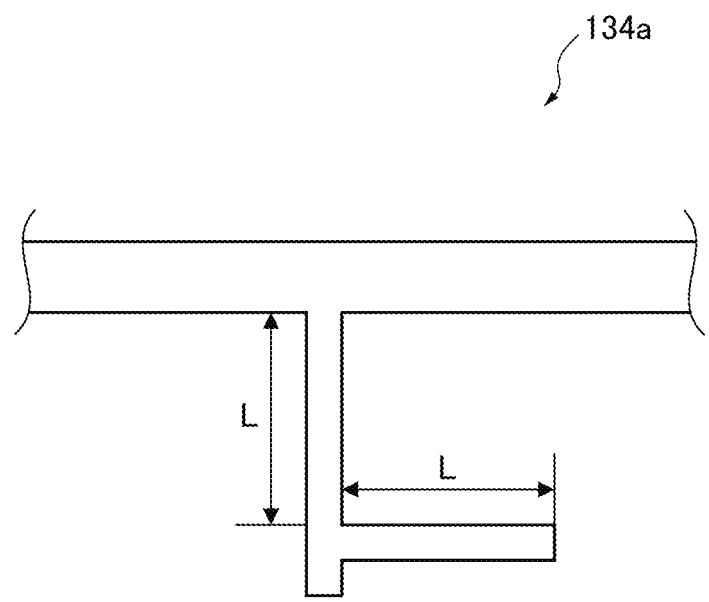
FIG. 5 illustrates an exemplary circuit forming a low-pass filter of FIG. 3.
Figure 6:
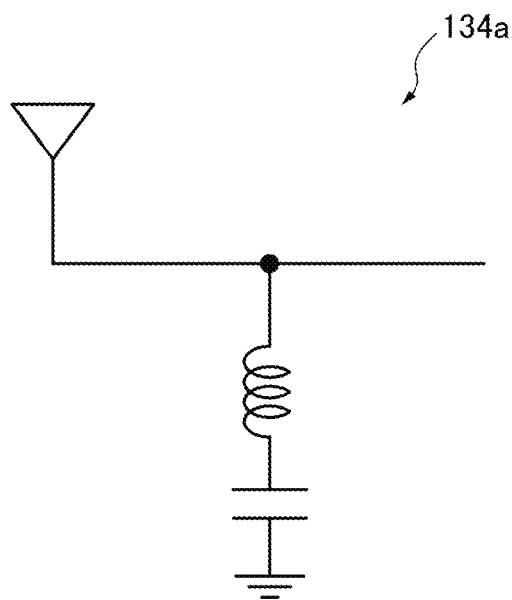
FIG. 6 illustrates another exemplary circuit forming the low-pass filter of FIG. 3.

The LPF 134a can be implemented by a stub line illustrated in FIG. 5 or a trap circuit illustrated in FIG. 6. The line length L of the stub line is so determined as to have a length of a quarter of the wavelength corresponding to the carrier frequency. The trap circuit is so configured that a resonance frequency of a resonance circuit formed by an inductor and a capacitor matches the carrier frequency.

The increase in the electrostatic capacitance of the antenna 131 causes a variation in the low-frequency component of the signal flowing through the antenna 131. The detection circuit 134*b* is configured to output a detection signal DT corresponding to the variation amount.

As illustrated in FIG. 2, the processor 132 of the UI device 13 is configured to transfer the detection signal DT outputted from the detector 134 to the control device 11.

Accordingly, the reception interface 111 of the control device 11 is configured as an interface capable of accepting the detection signal DT transmitted from the UI device 13 as well.

The processor 112 of the control device 11 is configured to determine whether the amount of variation in the signal at the antenna 131 corresponding to the detection signal DT accepted by the reception interface 111 exceeds a threshold value. The processor 112 is configured to determine that the hand of the user 40 approaches the antenna 131 in response to the determination that the amount of variation exceeds the threshold value.

The control device 11 includes an output interface 113. The output interface 113 is configured as an interface for outputting a control signal CT for causing the locking/unlocking device 12 to unlock the door 21.

The processor 112 is configured to output the control signal CT from the output interface 113 in response to the determination that the authentication of the mobile device 50 based on the authentication information AU described above is approved and the determination that the hand of the user 40 approaches the antenna 131.

It should be noted that the processor 132 of the UI device 13 may be configured to output the detection signal DT only in the case where the amount of variation in the signal at the antenna 131 exceeds the threshold value. Here, the processor 112 of the control device 11 determines that the hand of the user 40 approaches the antenna 131 based on the fact that the detection signal DT is accepted by the reception interface 111.

According to such a configuration, when the user 40 brings an appropriate mobile device 50 close to the knob 22 and grips the knob 22, the locking/unlocking of the door 21 by the locking/unlocking device 12 is allowed. When the user 40 grips the knob 22, there is a high possibility that the user 40 intends to open or close the door 21. The locking/unlocking of the door 21 is not allowed only with the authentication approval of the mobile device 50 but the detection of the gripping of the knob 22 is added to the condition for allowing the locking/unlocking operation. As a result, it is possible to suppress the occurrence of a situation that the locking/unlocking is unexpectedly performed without the user's intention for opening/closing the door 21.

In addition, since the antenna 131 for the proximity wireless communication with the mobile device 50 is also used as an electrode of the electrostatic sensor, there is no need to install an independent electrostatic sensor for confirming the intention of the user 40. As a result, not only it is possible to suppress the enlargement of the UI device 13, but also it is possible to avoid a situation in which the electrode plate used in the electrostatic sensor affects the frequency characteristic of the antenna 131. Accordingly, it is possible to improve the convenience of the authentication system 10 using the mobile device 50.

In particular, in a case where the UI device 13 is incorporated in a structure having a limited size, such as the knob 22, the above-described advantage is more remarkable.

The processor 132 of the UI device 13 may be configured to be capable of switching between a first state in which the amplitude modulation of the magnetic field emitted from the antenna 131 is performed and a second state in which the amplitude modulation is not performed.

According to such a configuration, in the first state, the antenna 131 can be used for both the proximity wireless communication and the detection of the change in the electrostatic capacitance as described above. In the second state, the antenna 131 can be used only for the detection of the change in the electrostatic capacitance.

The processor 132 of the UI device 13 having various functions described above can be implemented by an exclusive integrated circuit capable of executing a computer program for executing processing associated with the functions. Examples of the exclusive integrated circuit include a microcontroller, an ASIC, and an FPGA. In this case, the above-described computer program is pre-installed in the memory element included in an exclusive integrated circuit. The authentication information AU may be stored in the memory element.

The processor 112 of the control device 11 having various functions described above can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing processing associated with the functions can be stored in the ROM. The authentication information to be subjected to the collation may be stored in the general-purpose memory. The general-purpose microprocessor designates at least a part of the computer program stored in the ROM, loads the program on the RAM, and executes the processing described above in cooperation with the RAM.

The processor 112 may be implemented by an exclusive integrated circuit capable of executing the above-described computer program. Examples of the exclusive integrated circuit include a microcontroller, an ASIC, and an FPGA. In this case, the above-described computer program is pre-installed in the memory element included in an exclusive integrated circuit. The authentication information to be subjected to the collation may be stored in the memory element. The processor 112 may also be implemented by a combination of a general-purpose microprocessor and an exclusive integrated circuit.

The above embodiments are merely illustrative for facilitating understanding of the gist of the presently disclosed subject matter. The configuration according to each of the above embodiments can be appropriately modified or changed without departing from the gist of the presently disclosed subject matter.

In the above embodiment, the antenna 131 of the UI device 13 is configured so as to include the coil 131*a* capable of serving as a loop antenna for performing the proximity wireless communication with the mobile device 50. However, the antenna 131 may be configured as a planar antenna for performing short-range wireless communication with the mobile device 50. In this case, the planar antenna can be used as an electrode of the electrostatic sensor.

In the above embodiment, the antenna 131 of the UI device 13 includes the coil 131*a* and the capacitor 131*b*. However, the capacitor 131*b* may be omitted. In addition to or in place of the capacitor 131*b*, the antenna 131 may include an auxiliary inductor element. The auxiliary inductor element may be connected in series or in parallel with the coil 131*a*.

In the above embodiment, the antenna 131 of the UI device 13 is incorporated in the knob 22. However, the antenna 131 may be disposed so as to be exposed on the surface of the knob 22. In this case, the detector 134 is configured to detect the approach or contact of the user 40 with the antenna 131 based on the change in the electrostatic capacitance.

The mobile entity in which the authentication system 10 is installed is not limited to the vehicle 20. Examples of another mobile entity include railways, aircraft, and ships. The mobile entity may not require a driver.

The reclosable body to be locked/unlocked by the locking/unlocking device 12 is not limited to the door 21 of the vehicle 20. Doors and windows in homes and facilities may also be an example of the reclosable body.

The device whose operation is controlled by the control device 11 is not limited to the locking/unlocking device. As long as the approval of the authentication of the mobile device 50 and the detection of the approach or contact of the object to be detected with the antenna 131 are to be a trigger, various equipment installed in the mobile entity, the house, the facility, and the like may be the device to be controlled. Depending on the application, a body part or various tools other than the hand of the user 40 may be the object to be detected.

The invention claimed is:

1. An authentication system, comprising:
an antenna configured to receive authentication information through wireless communication from a mobile device adapted to be carried by a user;
a detector configured to perform detection of approach or contact of a hand of the user with respect to the antenna based on a change in an electrostatic capacitance; and
a control device configured to control an operation of a device to be controlled based on a result of the detection in addition to authentication for authenticating the mobile device with the authentication information,
wherein the control device is configured to switch between a first state that amplitude modulation of a magnetic field emitted from the antenna is performed and a second state that the amplitude modulation is not performed,
wherein the antenna in the first state is configured to be used for both a proximity wireless communication and detection of the change in the electrostatic capacitance, and
wherein the antenna in the second state is configured to be used only for the detection of the change in the electrostatic capacitance.

2. The authentication system according to claim 1, wherein the antenna is a loop antenna.

3. The authentication system according to claim 1, wherein the device to be controlled is a locking/unlocking device configured to lock/unlock a reclosable body.

4. The authentication system according to claim 3, wherein the antenna and the detector are incorporated in a knob adapted to be used to open/close the reclosable body.

5. The authentication system according to claim 3, wherein the reclosable body is installed in a mobile entity.

6. A user interface device, comprising:
an antenna configured to receive authentication information through wireless communication from a mobile device adapted to be carried by a user;
a detector configured to perform detection of approach or contact of a hand of the user with respect to the antenna based on a change in an electrostatic capacitance; and
a processor configured to output the authentication information and a result of the detection to a control device that is configured to control an operation of a device to be controlled,
wherein the processor is configured to switch between a first state that amplitude modulation of a magnetic field emitted from the antenna is performed and a second state that the amplitude modulation is not performed,
wherein the antenna in the first state is configured to be used for both a proximity wireless communication and detection of the change in the electrostatic capacitance, and
wherein the antenna in the second state is configured to be used only for the detection of the change in the electrostatic capacitance.

7. The user interface device according to claim 6, wherein the device to be controlled is a locking/unlocking device configured to lock/unlock a reclosable body; and
wherein the antenna and the detector are incorporated in a knob adapted to be used to open/close the reclosable body.

8. A knob adapted to be used to open/close a reclosable body, comprising:
an antenna configured to receive authentication information through wireless communication from a mobile device adapted to be carried by a user;
a detector configured to perform detection of approach or contact of a hand of the user with respect to the antenna based on a change in an electrostatic capacitance; and
a processor configured to output the authentication information and a result of the detection to a control device that is configured to control an operation of a locking/unlocking device configured to lock/unlock the reclosable body,
wherein the processor is configured to switch between a first state that amplitude modulation of a magnetic field emitted from the antenna is performed and a second state that the amplitude modulation is not performed,
wherein the antenna in the first state is configured to be used for both a proximity wireless communication and detection of the change in the electrostatic capacitance, and
wherein the antenna in the second state is configured to be used only for the detection of the change in the electrostatic capacitance.

* * * * *